United States Patent
Baek

(10) Patent No.: US 10,780,316 B2
(45) Date of Patent: Sep. 22, 2020

(54) LIP MUSCLE STRENGTHENING DEVICE FOR PREVENTING MALOCCLUSION AND IMPROVING MOUTH BREATHING

(71) Applicants: FES CO., LTD., Ulsan (KR); Jae Ho Baek, Busan (KR)

(72) Inventor: Jae Ho Baek, Busan (KR)

(73) Assignees: FES CO., LTD., Ulsan (KR); Ja Ho Baek, Busan (KR)

( * ) Notice: Subject to any disclaimer, the term of this patent is extended or adjusted under 35 U.S.C. 154(b) by 75 days.

(21) Appl. No.: 16/090,273

(22) PCT Filed: Feb. 28, 2017

(86) PCT No.: PCT/KR2017/002183
§ 371 (c)(1),
(2) Date: Oct. 1, 2018

(87) PCT Pub. No.: WO2017/171246
PCT Pub. Date: Oct. 5, 2017

(65) Prior Publication Data
US 2019/0111311 A1    Apr. 18, 2019

(30) Foreign Application Priority Data
Mar. 29, 2016 (KR) .................. 10-2016-0037760

(51) Int. Cl.
*A63B 23/03* (2006.01)
*A63B 71/06* (2006.01)
(Continued)

(52) U.S. Cl.
CPC .............. *A63B 23/032* (2013.01); *A61C 7/08* (2013.01); *A63B 23/03* (2013.01); *A63B 71/06* (2013.01); *A61C 7/36* (2013.01)

(58) Field of Classification Search
CPC ......... A63B 23/03; A63B 23/032; A61C 7/08; A61C 7/36
See application file for complete search history.

(56) References Cited

U.S. PATENT DOCUMENTS 1,714,029 A * 5/1929 Kuhn .................... A61H 13/00
    482/11
1,851,865 A * 3/1932 Ptacek ................. A63B 23/032
    482/11

(Continued)

FOREIGN PATENT DOCUMENTS

JP    2002-017873 A    1/2002
JP      3118109 U      1/2006
(Continued)

OTHER PUBLICATIONS

International Search Report for PCT/KR2017/002183 dated May 22, 2017 from Korean Intellectual Property Office.

Primary Examiner — Jennifer Robertson
(74) Attorney, Agent, or Firm — Revolution IP, PLLC

(57) ABSTRACT

A lip muscle strengthening device includes: an upper plate inserted into a mouth of a user including a first electrode formed on a bottom surface; a lower plate inserted into the mouth of the user including a second electrode formed on a top surface; an outer support plate adhered to an outer lip of the user and supporting a front end of the upper plate and a front end of the lower plate in a connected state while separating the upper plate and the lower plate from each other; and a pressure recognition unit connected to the first electrode and the second electrode and enabling the user to recognize a closed state of the mouth when the user pushes the upper plate and the lower plate with the upper lip and the lower lip and the first electrode and the second electrode contact each other.

8 Claims, 2 Drawing Sheets

[FIG. 1]

(51) Int. Cl.
*A61C 7/08* (2006.01)
*A61C 7/36* (2006.01)

(56) References Cited

U.S. PATENT DOCUMENTS

| | | | | |
|---|---|---|---|---|
| 6,514,176 | B1* | 2/2003 | Norton | A63B 21/002 |
| | | | | 128/848 |
| 6,524,262 | B1* | 2/2003 | Akihiro | A63B 23/032 |
| | | | | 482/11 |
| 7,476,180 | B1* | 1/2009 | Cobb | A63B 21/0004 |
| | | | | 482/11 |
| 2003/0088158 | A1* | 5/2003 | Chien | A63B 23/032 |
| | | | | 600/237 |
| 2013/0260963 | A1* | 10/2013 | Takashi | A63B 23/032 |
| | | | | 482/11 |
| 2018/0078334 | A1* | 3/2018 | Lotan | A61B 5/682 |

FOREIGN PATENT DOCUMENTS

| | | |
|---|---|---|
| JP | 2006-055658 A | 3/2006 |
| JP | 5240882 B1 | 4/2013 |
| KR | 10-1394316 B1 | 9/2014 |

\* cited by examiner

[FIG. 1]
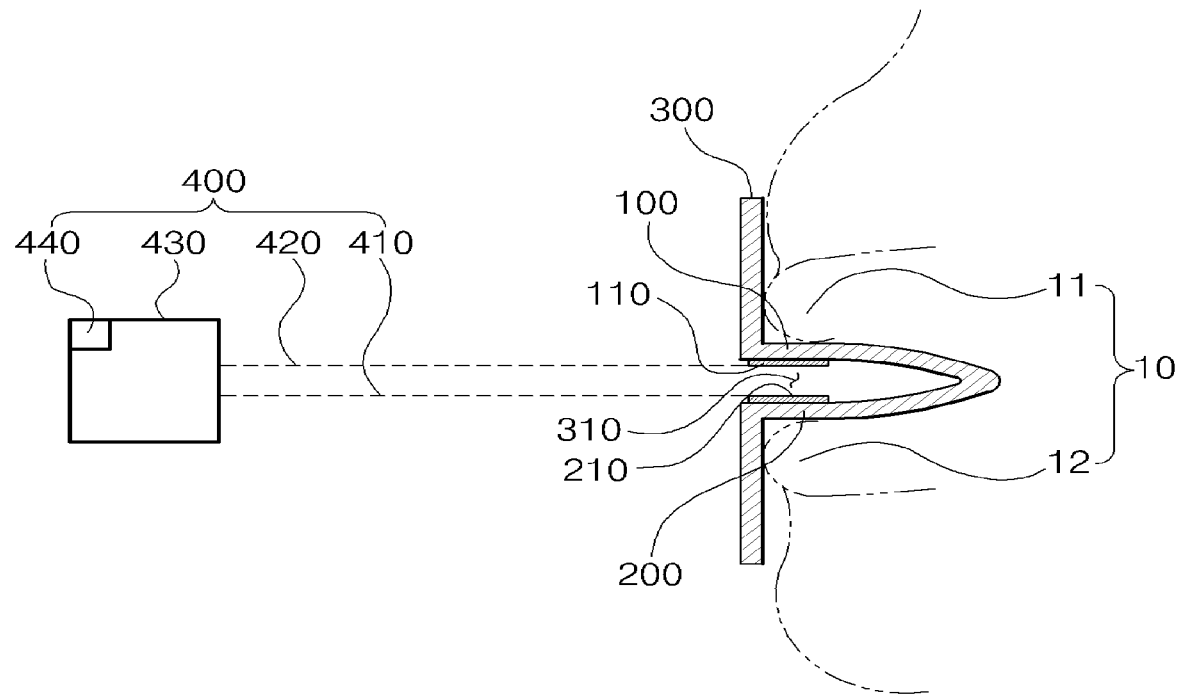
[FIG. 2]
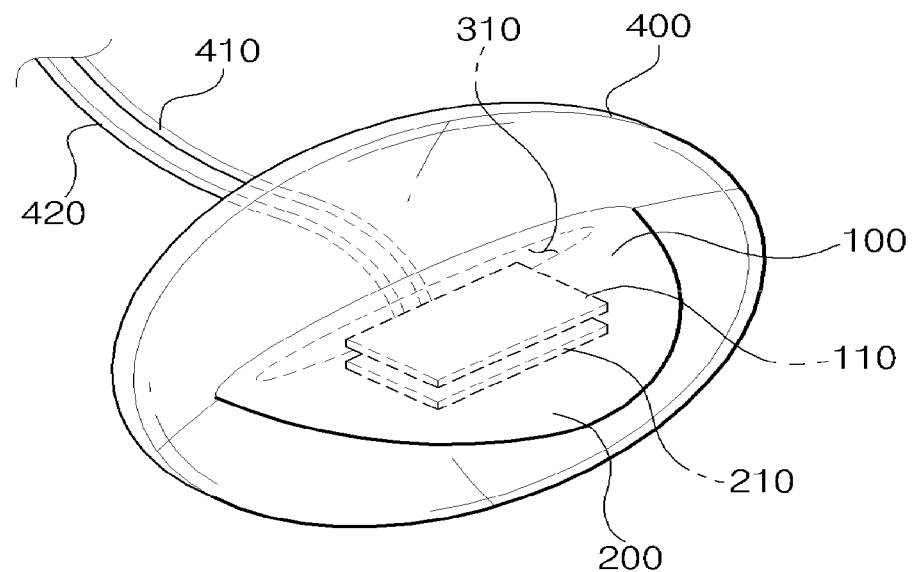

[FIG. 3]
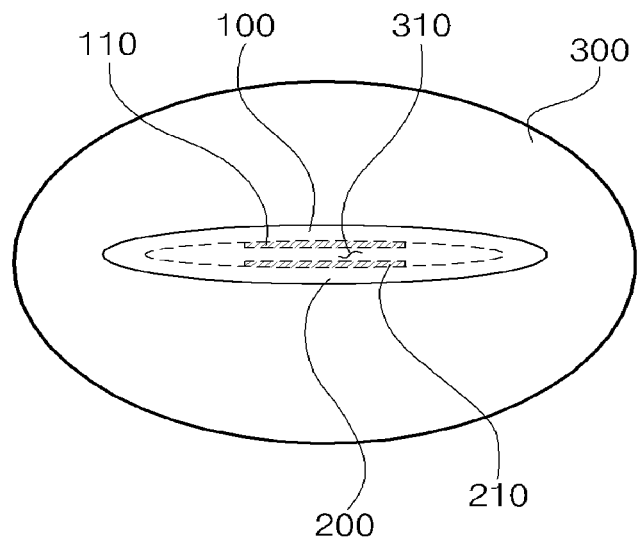
[FIG. 4]
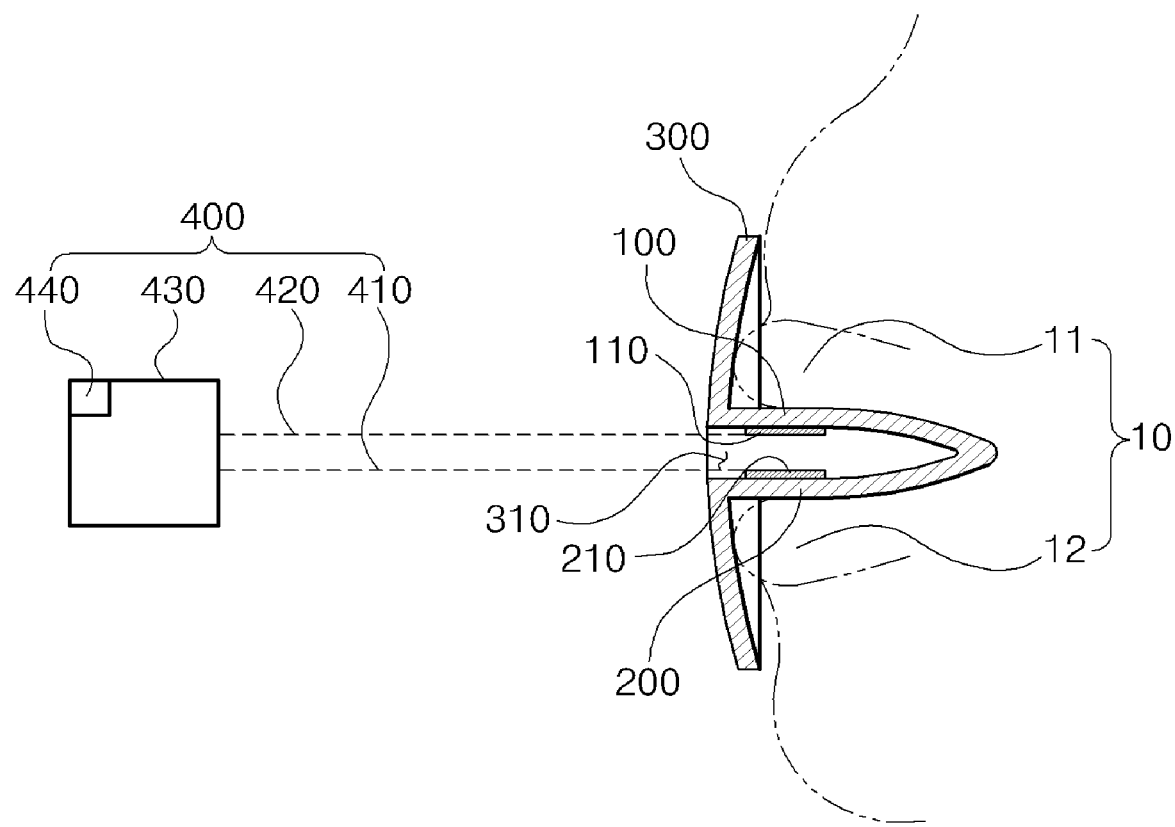

LIP MUSCLE STRENGTHENING DEVICE FOR PREVENTING MALOCCLUSION AND IMPROVING MOUTH BREATHING

TECHNICAL FIELD

The present disclosure relates to a lip muscle strengthening device for preventing malocclusion and improving mouth breathing, wherein occurrence of the malocclusion is prevented by enabling a user to have habit of breathing through the nose while the lips are compressed, and in addition, rhinitis and maxillary sinusitis are improved and tonsillitis and adenoiditis are improved.

BACKGROUND ART

In general, breathing through the mouth causes not only an anterior crossbite and dislocation of upper and lower posterior teeth due to underdeveloped nasomaxillary complex, but also an openbite and deformation of upper and lower dental arches to a 'V' shape due to disturbance of buccinator mechanism.

Also, disturbance in the entire respiratory system starting from the nasal cavity is induced, and adenoiditis and tonsillitis are often incurred. In the oral cavity, decalcification of the overall teeth due to lack of saliva and interference between maxillary first molars and the primary second molars due to a narrowed nasomaxillary complex are induced, and accordingly, abnormal absorption of unilateral or bilateral maxillary primary second molars is induced. Mucosal retention cyst is also one of common side effects occurred due to mucosal deformation in the maxillary sinus.

Such mouth breathing is mainly caused by narrow airway due to low muscle activity and the changes of cervical vertebrae posture owing to recent excessive use of smartphones, and reduction of mouth and lip activities due to text message transmission or the like, and in this regard, habit of finger sucking or nail biting often occur together as an additional cause.

Thus, when the mouth breathing is effectively corrected before the nasomaxillary complex is completed, the malocclusion may be prevented at the early stage with the minimum use of or without having to use a fixed or removable orthodontic appliance.

Such a device that inhibits mouth breathing and enables breathing through the nose is disclosed in JP 2006-55658 (published on Mar. 2, 2006).

However, a conventional mouth breathing preventing device of the prior art prevents the lips of a user from spreading by simply arranging a projection between the lips, and thus an exercise effect of a lip muscle is low while it is difficult to stably maintain a closed state of the lips because the user would not voluntarily close the lips forcing the lip muscle. In addition, since the projection needs to continuously maintain contact with the lips of the user, the lips may be hurt due to friction or collision with the projection.

DESCRIPTION OF EMBODIMENTS

Technical Problem

Provided are a lip muscle strengthening device for preventing malocclusion and improving mouth breathing, wherein an exercise effect of a lip muscle is increased while breathing through the nose is stably maintained by enabling a user to voluntarily move the lip muscle to close the lips.

Solution to Problem

According to an aspect of the present disclosure, a lip muscle strengthening device for preventing malocclusion and improving mouth breathing, the lip muscle strengthening device includes: an upper plate inserted into a mouth of a user so as to be positioned below an upper lip and including a first electrode formed on a bottom surface; a lower plate inserted into the mouth of the user so as to be positioned above a lower lip and including a second electrode formed on a top surface; an outer support plate adhered to an outer lip of the user and supporting a front end of the upper plate and a front end of the lower plate in a connected state while separating the upper plate and the lower plate from each other; and a pressure recognition unit connected to the first electrode and the second electrode and enabling the user to recognize a closed state of the mouth when the user pushes the upper plate and the lower plate with the upper lip and the lower lip and the first electrode and the second electrode contact each other.

The upper plate, the lower plate, and the outer support plate may be formed of a ductile material.

The outer support plate may be thicker than the thickness of the upper plate or the thickness of the lower plate.

A rear portion of the outer support plate may have a plane structure.

A rear portion of the outer support plate may have a curved structure that is concave forward so as to be adhered to an outer mouth of the user.

A connecting hole penetrating from a front portion to the rear portion of the outer support plate may be provided between a portion of the outer support plate where one end of the upper plate and one end of the lower plate are connected to each other.

The pressure recognition unit may include: a first cable having one end connected to the first electrode; a second cable having one end connected to the second electrode; and an output unit connected to the other end of the first cable and the other end of the second cable and outputting the closed state of the mouth of the user to a display by being operated when the first electrode and the second electrode contact each other.

The pressure recognition unit may further include an alarm unit enabling the user to recognize when the contact between the first electrode and the second electrode is released.

Advantageous Effects of Disclosure

According to the lip muscle strengthening device for preventing malocclusion and improving mouth breathing of the present disclosure, an upper plate and a lower plate are arranged between an upper lip and a lower lip of a user, and then when the user pushes the upper plate and the lower plate with the upper lip and the lower lip by closing the mouth, a first electrode and a second electrode are brought into contact such that the user recognizes a closed state of the mouth while efficiently increasing an exercise effect of a lip muscle.

BRIEF DESCRIPTION OF DRAWINGS

FIG. 1 is a schematic diagram of a lip muscle strengthening device for preventing malocclusion and improving mouth breathing, according to an embodiment of the present disclosure.

FIG. 2 is a partially enlarged perspective view of FIG. 1.

FIG. 3 is a front view of FIG. 2.

FIG. 4 is a schematic diagram of a lip muscle strengthening device for preventing malocclusion and improving mouth breathing, according to another embodiment of the present disclosure.

BEST MODE

Hereinafter, exemplary embodiments of the present disclosure will be described in detail with reference to accompanying drawings.

FIG. 1 is a schematic diagram of a lip muscle strengthening device for preventing malocclusion and improving mouth breathing, according to an embodiment of the present disclosure, FIG. 2 is a partially enlarged perspective view of FIG. 1, and FIG. 3 is a front view of FIG. 2. Referring to FIGS. 1 through 3, the lip muscle strengthening device for preventing malocclusion and improving mouth breathing, according to an embodiment, includes an upper plate 100, a lower plate 200, an outer support plate 300, and a pressure recognition unit 400.

The upper plate 100 and the lower plate 200 are a plate portion inserted into a mouth 10 of a user so as to be positioned between an upper lip 11 and a lower lip 12 of the mouth 10. Here, the upper plate 100 is inserted into the mouth 10 of the user so as to be positioned below the upper lip 11, and is pushed downward by the upper lip 11 when the user closes the mouth 10.

Also, a first electrode 110 is formed on a bottom surface of the upper plate 100, i.e., on a surface portion facing a top surface of the lower plate 200. Such a first electrode 110 contacts a second electrode 120 formed on the lower plate 200 when the user closes the mouth, i.e., when the upper lip 11 and the lower lip 12 contact each other.

The lower plate 200 is inserted into the mouth 10 of the user so as to be positioned above the lower lip 12, and is pushed upward by the lower lip 12 when the user closes the mouth.

Also, the second electrode 210 is formed on the top surface of the lower plate 200, i.e., on a surface portion facing the bottom surface of the upper plate 100. In other words, the second electrode 210 is formed on a location of the top surface of the lower plate 200, which is symmetrical to the first electrode 110, and thus contacts the first electrode 110 when the user closes the mouth 10.

Also, the upper plate 100 and the lower plate 200 are each coupled to a rear portion of the outer support plate 300 such that when the user does not close the mouth 10 with force, a front end of the upper plate 100 and a front end of the lower plate 200 maintain a separated state in a vertical direction. Here, it is illustrated that an edge portion of the upper plate 100 and an edge portion of the lower plate 200 excluding the front end of the upper plate 100 and the front end of the lower plate 200, i.e., two side-end edges and a rear-end edge of the upper plate 100 and symmetrically-arranged two side-end edges and a rear-end edge of the lower plate 200 are coupled to each other, but alternatively, the two side-end edges and the rear-end edge of the upper plate 100 may be spaced apart from the symmetrically-arranged two side-end edges and the rear-end edge of the lower plate 200.

As such, when the user closes the mouth such that the upper plate 100 and the lower plate 200 contact each other, the first electrode 110 and the second electrode 120 are brought into contact with each other to operate the pressure recognition unit 400, thereby enabling the user to recognize that the breathing is performed through the nose while the mouth is closed.

In addition, the upper plate 100 and the lower plate 200 are formed of a synthetic resin material having ductility such as to be bent downward and upward by the upper lip 11 and the lower lip 12 respectively, when the upper plate 100 and the lower plate 200 are inserted into the mouth 10 of the user while being connected to the outer support plate 300 and the user closes the mouth 10. Also, since the upper plate 100 and the lower plate 200 are inserted into the mouth 10 of the user, the upper plate 100 and the lower plate 200 may be formed of a synthetic resin material harmless to humans.

The outer support plate 300 is a plate portion that is connected to and supports the upper plate 100 and the lower plate 200 to be spaced apart from each other in the vertical direction and in addition, is connected to and supports the upper plate 100 and the lower plate 200 such as not to be completely inserted into the mouth 10, when the user does not close the mouth 10.

Also, the rear portion of the outer support plate 300 is coupled to each of the front end of the upper plate 100 and the front end of the lower plate 200 and is adhered to the outside of the mouth 10 of the user when the upper plate 100 and the lower plate 200 are inserted into the mouth 200. Here, the rear portion of the outer support plate 300, i.e., a surface portion facing the outside the mouth 10 of the user, is illustrated to have a plane structure, but is not limited thereto, and the rear portion of the outer support plate 300 may have a curved structure concave forward as shown in FIG. 4 such that a degree of being adhered to the outside of the mouth 10 when arranged outside the mouth 10 of the user is increased.

Here, the outer support plate 300 is formed of a synthetic resin material having ductility such that, when arranged outside the mouth 10 of the user, a stable adhered state is maintained while the skin of the user is prevented from being damaged. Also, the outer support plate 300 may be formed of a synthetic resin material harmless to humans. As such, the outer support plate 300 may be formed of the same material as the upper plate 100 and the lower plate 200, while the thickness of the outer support plate 300 is greater than the thickness of the upper plate 100 or the thickness of the lower plate 200 such as to be stably connected to and stably support the upper plate 100 and the lower plate 200. As such, the thickness of the outer support plate 300 is formed to be greater than the thickness of the upper plate 100 or the thickness of the lower plate 200, and thus the mouth 10 of the user is prevented from being closed easily while the muscle strength of the upper lip 11 and the lower lip 12 of the user is enhanced.

The pressure recognition unit 400 enables the user to recognize that the mouth 10 is closed when the first electrode 110 and the second electrode 210 are brought into contact. In other words, when the upper plate 100 and the lower plate 200 are inserted into the mouth 10 of the user, i.e., between the upper lip 11 and the lower lip 12 of the user, and the user presses the upper plate 100 and the lower plate 200 respectively with the upper lip 11 and the lower lip 12 to bring the first electrode 110 and the second electrode 210 into contact, the pressure recognition unit 400 is operated as power is applied thereto, and thus the user recognizes a closed state of the mouth 10. Such a pressure recognition unit 400 includes a first cable 410, a second cable 420, and an output unit 430.

The first cable 410 electrically connects the first electrode 110 to the output unit 430. In other words, one longitudinal end of the first cable 410 is connected to the first electrode 110 and the other longitudinal end of the first cable 410 is connected to the output unit 430.

The second cable 420 electrically connects the second electrode 120 to the output unit 430. In other words, one longitudinal end of the second cable 420 is connected to the second electrode 120 and the other longitudinal end of the second cable 420 is connected to the output unit 430.

When the first electrode 110 and the second electrode 120 are brought into contact, the output unit 430 is operated and outputs to a display that the mouth 10 of the user is closed. Such an output unit 430 may include a power supply unit (not shown) that applies power when the first electrode 110 and the second electrode 120 are brought into contact such that an output through the display is performed. Here, when power is applied according to the contact between the first electrode 110 and the second electrode 120, the output unit 430 displays a closed degree of the mouth 10 of the user in time, but alternatively, a closed state of the mouth 10 of the user may be displayed in 'O' or 'X'.

Also, the pressure recognition unit 400 may include an alarm unit 440 enabling the user to recognize when the contact between the first electrode 110 and the second electrode 210 is released. In other words, when the contact between the first electrode 110 and the second electrode 210 is released after the output unit 430 displays the closed state of the mouth 10 of the user, the alarm unit 440 generates notification sound or vibration for the user to immediately check the release of the contact.

As such, in the lip muscle strengthening device for preventing malocclusion and improving mouth breathing, according to an embodiment, the upper plate 100 and the lower plate 200 are arranged between the upper lip 11 and the lower lip 12 of the mouth 10 of the user, and then when the user pushes the upper plate 100 and the lower plate 200 with the upper lip 11 and the lower lip 12 by closing the mouth 10, the first electrode 110 and the second electrode 210 are brought into contact such that the user recognizes a closed state of the mouth 10 while efficiently increasing an exercise effect of a lip muscle.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A lip muscle strengthening device for preventing malocclusion and improving mouth breathing, the lip muscle strengthening device comprising:
    an upper plate configured to be inserted into a mouth of a user so as to be positioned below an upper lip and comprising a first electrode formed on a bottom surface;
    a lower plate configured to be inserted into the mouth of the user so as to be positioned above a lower lip and comprising a second electrode formed on a top surface;
    an outer support plate configured to be adhered to an outer lip of the user and supporting a front end of the upper plate and a front end of the lower plate in a connected state while separating the upper plate and the lower plate from each other; and
    a pressure recognition unit connected to the first electrode and the second electrode and enabling the user to recognize a closed state of the mouth when the user pushes the upper plate and the lower plate with the upper lip and the lower lip and the first electrode and the second electrode contact each other.

2. The lip muscle strengthening device of claim 1, wherein the upper plate, the lower plate, and the outer support plate are formed of a ductile material.

3. The lip muscle strengthening device of claim 1, wherein the outer support plate is thicker than the upper plate or the lower plate.

4. The lip muscle strengthening device of claim 1, wherein a rear portion of the outer support plate has a plane structure.

5. The lip muscle strengthening device of claim 1, wherein a rear portion of the outer support plate has a curved structure that is concave forward so as to be adhered to an outer mouth of the user.

6. The lip muscle strengthening device of claim 1, wherein a connecting hole penetrating from a front portion to the rear portion of the outer support plate is provided between a portion of the outer support plate where one end of the upper plate and one end of the lower plate are connected to each other.

7. The lip muscle strengthening device of claim 1, wherein the pressure recognition unit comprises:
    a first cable having a first end connected to the first electrode;
    a second cable having a first end connected to the second electrode; and
    an output unit connected to a second end of the first cable and a second end of the second cable and outputting the closed state of the mouth of the user to a display by being operated when the first electrode and the second electrode contact each other.

8. The lip muscle strengthening device of claim 1, wherein the pressure recognition unit further comprising an alarm unit enabling the user to recognize when the contact between the first electrode and the second electrode is released.

* * * * *